Aug. 5, 1958  M. L. PARKER  2,845,852
FILM RACK
Filed Oct. 28, 1954  2 Sheets-Sheet 1
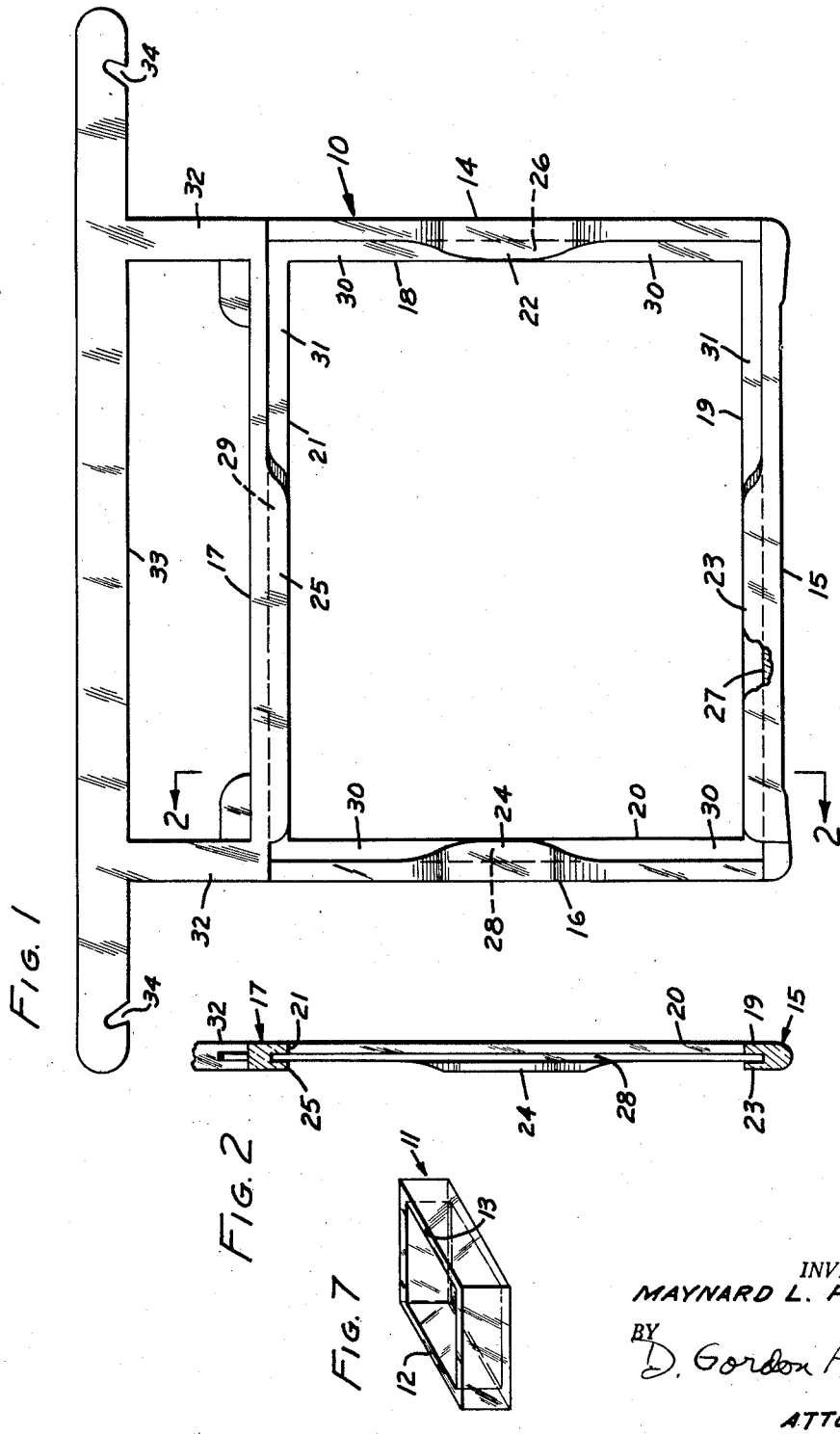
INVENTOR.
MAYNARD L. PARKER
BY
D. Gordon Angus
ATTORNEY.

Aug. 5, 1958 M. L. PARKER 2,845,852
FILM RACK
Filed Oct. 28, 1954 2 Sheets-Sheet 2
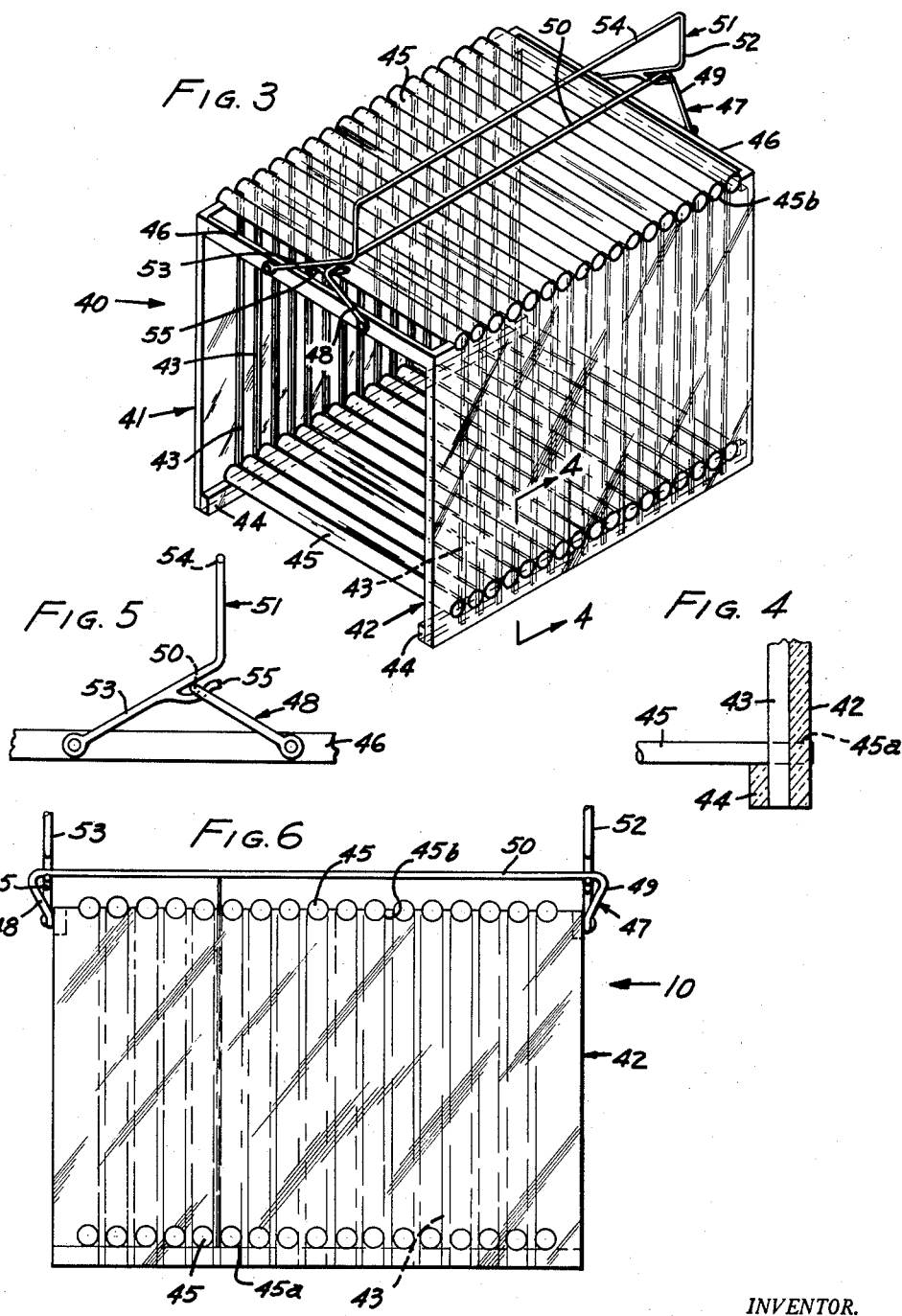
INVENTOR.
MAYNARD L. PARKER
BY
D. Gordon Angus
ATTORNEY.

United States Patent Office 2,845,852
Patented Aug. 5, 1958

2,845,852

FILM RACK

Maynard L. Parker, Los Angeles, Calif.

Application October 28, 1954, Serial No. 465,189

2 Claims. (Cl. 95—100)

This invention relates to photographic film processing equipment, and in particular to means for holding the film negative during the development process.

During the development of negatives, and particularly of color negatives, it is customary to place the negative in a film rack or hanger in order to suspend it in the developing solutions. Ordinarily these hangers and racks have an open frame structure with grooves or slots therein. The film is slid into the slot, to be held therein while being developed.

It is important that processing chemical reach all portions of the film surface, and that adjacent films do not touch each other while they are still wet. Furthermore, in the development of color pictures, one part of the development process requires that the negative be exposed to light to create what is known as a "reversal exposure." It is important to the successful development of the film that this light reach all portions of the film surface.

These requirements impose restrictions on the design of conventional hangers. In meeting these restrictions there have been developed hangers which have certain undesirable features, particularly in regard to convenience in manual handling in the dark, positive retention of the film, and exposure of the film to light during processing of the negative.

For example, in one well-known type of film hanger which is made of opaque metal, the film is held in three wide stationary slots, by a pivoted member. The slots need to be wide so that light can be shone on the outer edges of the film for a reversal exposure, and the pivoted member, which is inconvenient to use in the dark, is necessitated by the width of the slots. Even with the pivoted members, the slots are still so wide that the wetted film is apt to sag and make contact with a neighboring negative in the same tank, spoiling both negatives. To avert this result, the hangers and rack slots have been widely separated in hitherto-known devices, thereby reducing the capacity of a given developing tank. When it is considered that it takes as long as 2½ hours to develop a color negative, it will be appreciated that any reduction in processing capacity is economically undesirable.

In addition, it has not been found practicable to "gang" a number of the hitherto-known film hangers and racks, since it has been necessary to handle each negative singly to assure a full reversal exposure. This results from the opacity of the hanger.

It is an object of this invention to provide film hangers and racks which overcome the above disadvantages and which permit color negatives to be developed in groups as well as singly.

A further object is to provide film racks and hangers which increase the film-handling capacity of a given developing tank.

An allied object is to provide film hangers and racks which are useful for both color and black-and-white negatives.

A feature of the invention resides in a film hanger having a rigid frame with interrupted flanges which form part of the edge grooves in the hanger frame, whereby part of at least some of the grooves are open at a side thereof so as to facilitate the insertion of a negative into the grooves.

A further feature of the invention resides in a film rack equipped to hold a plurality of negatives to be developed.

A related optional feature resides in making the film hangers and racks of transparent or translucent material, whereby the light necessary to create the reversal exposure in color photography can be provided to the negative by shining light directly upon the film through the hanger or rack while it is held therein.

A related optional feature of the invention resides in providing color film with its reversal exposure while in a transparent tank and held in transparent racks or hangers, whereby the reversal exposure can be provided without removing the negatives from the tank.

The above and other features of the invention will be fully understood from the following detailed description and the accompanying drawings, of which:

Fig. 1 is a plan view of a film hanger according to the invention;

Fig. 2 is a cross-section taken at line 2—2 of Fig. 1;

Fig. 3 is an oblique view of a film rack according to the invention;

Fig. 4 is a fragmentary detail in cross-section taken at line 4—4 of Fig. 3;

Fig. 5 is a fragmentary detail in elevation of a portion of Fig. 3;

Fig. 6 is a side view in elevation of the rack of Fig. 3; and

Fig. 7 is an oblique view of a tank in which the hanger of Fig. 1 and the rack of Fig. 3 can be immersed.

In Fig. 1 there is shown a film hanger 10, by means of which a film negative to be developed can be suspended in a tank. The tank may be made of any material which is resistant to the chemicals to be used in it. However, in order to take advantage of a preferred feature of the invention, a tank 11 for use with the hanger 10 will preferably be made of a material which permits the passage of light therethrough. Plexiglas is a good example. Such a material will hereafter be denoted as "translucent" which term is intended to include both translucency and transparency. The tank may be of any desired shape, but will usually be rectangular, having upper edges 12, 13 from which the hangers can be suspended.

The hanger itself comprises a rigid rectangular frame made up of four frame members 14, 15, 16, 17, which are joined together at the corners. Each of these frame members bears a continuous flange 18, 19, 20, 21, respectively formed on frame members 14, 15, 16, and 17. These continuous flanges extend from inner end to inner end of the frame members and meet to form a single continuous flange all the way around the inside of the frame.

Interrupted flanges 22, 23, 24 and 25 are disposed respectively on frame members 14, 15, 16 and 17, and face toward the center of the frame. They are spaced from their adjacent continuous flanges to form grooves 26, 27, 28 and 29, respectively in frame members 14, 15, 16 and 17. Interrupted flanges 23 and 25 are positioned near one end of their respective frame members, and near the same end. This leaves an open portion 31 at one end of both of the grooves 27 and 29. Interrupted flanges 22 and 24 are disposed at the middle of their frame members so as to leave open spaces 30 at each end of grooves 26 and 24. As best seen in Fig. 2, these flanges 22 and 24 are tapered down at their edges so as to end at the edge of the grooves.

Means for suspending the frame are provided which conveniently comprise risers 32 rigidly attached to the frame and to a cross bar 33. This crossbar may conveniently have notches 34 for suspending the hanger from a line to dry.

As seen from the side view of Fig. 2 the vertical frame members are thicker than the horizontal. This assures a proper separation of the frame members when a number of them are placed in the tank simultaneously. It also leaves a "slot" between adjacent horizontal frame members which permits free circulation of the developer solution between the adjacent hangers. This permits the elimination of the holes in the frame members which are found in hitherto-known devices. Such holes tend to form bubbles which interfere with proper development of the film.

The film hanger is preferably made of a transparent material such as Plexiglas, and may conveniently comprise a number of pieces which are cemented together according to well known practice. The material need not be so transparent throughout as to permit the passage of an image therethrough, but may be merely translucent if desired. Mere translucency is sufficient, since in making a reversal exposure of the colored negative it is only necessary to supply a minimum quantum of light. Within wide limits, there is little danger of overexposing the negative. Also the density of the light need not be uniform over the entire surface of the film in making this reversal exposure. Therefore the light transmissibility of the material of which the film hanger is made is not particularly critical so long as it permits sufficient light to pass to the film.

A film rack 40 according to the invention is best illustrated in Fig. 3. This rack comprises two side members 41, 42 each of which is conveniently made of a flat rectangular plate of translucent or transparent material such as Plexiglas. A number of vertically aligned grooves 43 are formed in each of the side members so as to be opposite, facing, and parallel to each other. At the bottom of each of the side members, across the surface of the grooves 43, there is cemented a stop bar 44. This stop bar extends across the entire length of the bottom of the side members.

The side members are spaced from each other by spacer rods 45 which conveniently comprise round Plexiglas rods which are cemented at the holes 45a in bottom of the side members and in grooves 45b at the top. These holes and grooves 45b are formed between the grooves 43 so that one of these spacer rods is disposed between each groove 43 at the top and bottom thereof. There is a groove immediately adjacent to both sides of every spacer rod except the end rods, there being a slot only on the inner side of those. These spacer rods hold the side members from each other and hold film negatives in their proper slots so they do not touch each other. The protruding upper bars aid the photographer in locating the slot for the film.

Additional structural integrity is given to the unit by providing transverse members 46 which interconnect the two side members. All of the above components are preferably made of translucent material so as not to impede the passage of light.

Convenient dimensions for a rack which can hold 20 4 x 5 film negatives are 5" high, 4¼ inches wide, and 5¼ inch long. These slots are spaced apart by approximately ¼ inch. This spacing can, of course, be varied and the smaller the film area, the closer the slots may be. The spacer rods 45 are conveniently made of ⅛" Plexiglas rod.

For easy handling of the rack and for locking film negatives in place, there is provided a handle and locking means. A locking bar 47 comprising a U-shaped member with two legs 48, 49 and a central locking bight portion 50, is pivoted by its two legs to the side members 46 so that the bight 50 is pivotable into place across the top of the film rack transverse to the upper spacer rods 45. In one pivoted position this locking bar can stand slightly above these spacer rods, and in another position it may be pivoted entirely out of the way of the top of the rack.

A cooperating handle member 51 also comprises a U-shaped member having legs 52, 53, which are pivoted to the transverse members 46 at points spaced from the attachment of legs 48 and 49. Legs 52 and 53 are longer than legs 48 and 49 so that the bight 54 stands farther above top of the rack than the bight 50 of the locking bar. On the underside of the legs 52 and 53 there are catch members 55 which are adapted to receive the bight 50 of the locking bar. When the locking bar bight 50 is inserted in the space between the catch member 55 and the legs 52 and 53 respectively, then a rigid linkage is formed which definitely positions the locking bar bight 50 at a predetermined position above the top of the rack. This also provides a means for holding the two members together when the device is lifted, using the bight 54 as a handle.

The use of the film hanger of Fig. 1 for holding a film negative for processing will now be described.

The negative is first inserted into grooves 27 and 29 by sliding it through the open spaces 31 in frame members 15 and 17. The length of these open spaces is sufficient that the longitudinal dimension of the film need not be bent excessively. The film negative is slid along the frame until it enters end groove 28.

The groove 28 has open corners 30. It will be found a significant convenience that the interrupted flange 24 stands only at the center of groove 28 for then sufficient retention for the film is provided at the center, but the entire edge of the film does not have to be inserted into a long narrow grooves. The middle of the film edge is easily caught in the short groove, and no care need be taken to fit the corners of the film into a groove. In loading a hanger in a dark room it is far more convenient to simply guide the middle of a film edge into a short central groove than to try to force an entire edge into an elongated groove.

After the film has reached and entered groove 28, it is bent slightly at the end adjacent the open space 31, and the last edge is slipped under the interrupted flange 22 into the groove 26. The entrance of the film into this remaining edge is also facilitated by the end cutout portions 30, so that only a short central portion of the film edge need be introduced into the groove 26.

The film is now firmly held in the hanger ready for the processing operations. The details of the developing of a film negative form no part of this invention and need not be described in detail here. However, one step in the processing of color film is significantly facilitated by the hanger of this invention. In color film developing, the film is placed in a first developer by suspending the hanger in tank 11 for the necessary period of time. Thereafter, the film is ordinarily removed from the first developer and exposed to light so as to provide what is commonly known as "reversal exposure."

In hitherto known devices it has been necessary to take considerable pains to be certain that light penetrated to all areas of the negative. The conventional opaque metal holders prevented direct penetration of light, and the negative had to be tilted in all directions to assure adequate exposure. By means of the transparent film hanger according to this invention, the entire hanger may simply be lifted between two lights and the "reversal exposure" is accomplished without further manipulation, since the light penetrates directly through the hanger to the film.

As an alternate means of carrying out this invention, a plurality of these hangers may be suspended in a tank such as tank 11, and the light can simply be shone through the tank walls. Then the hangers and films need never be removed from the tank for receiving the reversal exposure. When it is considered that these films are processed in large numbers, and that the processing of a single film may take as long as 2½ hours, it will be appreciated that any saving in manual handling, and any ability to increase the number of films whch can be handled at one time provide important savings.

The use of the film rack of Fig. 3 is somewhat similar. The handle 51 and locking bar 47 are first moved out of the way of the top of the rack. Then the films are loaded into the slots so as to fit therein. The films are separated from each other by the spacer bars 45. When the films are loaded, then the locking bar 47 is pivoted across the top, as is the handle 51 so that the bight 50 fits into the catches 55. The film rack is now a unit containing films which can be handled as a single body for immersion in any necessary solution. The bight 50 prevents films from jumping over a lower spacer rod to contact a neighboring film.

An important feature, which can be used if desired resides in making all parts of this film rack of translucent material so that in making the reversal exposure, the rack may simply be held up to a light and rotated to expose every negative. When a translucent tank is utilized the rack need not even be removed from the tank. In this case, the light can be shone on to the rack directly through the sides of the transparent tank, and sufficient light will reach the film of give the desired reversal exposure.

These rigid film-holding devices, by means of their unique retention means, permit of a construction in which the film may be loaded by introducing the narrow end into the grooves of the holders. There is then less flexure of the film in loading the racks and hangers, and therefore commensurately less difficulty in getting it into the slots. The film is held in these holders by virtue of its own compression by the rigid grooves, and therefore requires no moving parts to hold it in place.

Also since these devices can be made translucent, the grooves can be made narrower. This has two particular advantages. First, the film is held more positively, so that there is less chance of a negative's jumping from its groove to make contact with its neighbor, thus spoiling both negatives. Second, this narrower groove permits more hangers to fit into a given tank, since the hangers themselves may be made thinner, and more films may be placed in a given rack or tank, since each groove takes up a lesser proportion of the total width of the hanger device. These features are made possible by the translucency of the device.

The features of this invention are useful and novel, even when the device is made of opaque materials. However, when opaque materials are used, the grooves will have to be somewhat wider, and the capacity of a given piece of equipment will be proportionately reduced. It has been found that by making this equipment of translucent materials, the film-developing capacity of a given tank can be approximately doubled.

It will be appreciated that with the exception of the handle and locking devices of the rack of Fig. 3, the film rack and film hanger are entirely rigid and unitary, and that there are no moving parts to add complexity to manual operations in the dark room. It is obvious that the intensity of light permissible in a dark room is low, and any moving parts simply increase the difficulty of developing satisfactory pictures.

There is therefore provided in this invention a unitary device which simplifies the processing of both color and black and white negatives, and in which film handling in a dark room is facilitated.

This invention is not to be limited by the embodiments shown in the drawing and described in the description, which are given by way of example and not of limitation, but only in accordance with the scope of the appended claims.

I claim:

1. A film rack for holding film during developing thereof comprising: a pair of opposed substantially parallel planar side walls, each side wall having a plurality of parallel straight grooves therein whereby the grooves in one plate are spaced from, parallel to, and opposite from corresponding grooves in the opposite plate, a plurality of film separators disposed at the top and bottom of the side walls, there being one of said separators on each side of every one of said grooves at both ends of said grooves, a stop member comprising an elongated body affixed to each of said side walls at the bottom end of said grooves beneath said film separators, whereby the film separators at the top of said slot serve as guides to guide a sheet of film into a pair of opposed slots, and all separators serve to keep each said film separated from its neighboring film, said stop members restraining the film from passing beyond said slots, and said slots providing side supports for the side edges of said film, said rack also being provided with a locking bar pivoted thereto, said locking bar comprising a U-shaped member with two legs and a central locking bight portion, a transverse member joining the edges of the side walls at each end thereof, the legs of said U-shaped members being pivotally attached to said transverse members, whereby the U-shaped members can be pivoted so that the locking bight can be moved to a side of the top of the rack, and also to a locked position with the locking bight across the top of the rack and transverse to the film separators, and a handle member comprising two-handle member legs and a handle bight joining said legs, said handle member legs being pivotally mounted to the transverse members at points which are separated from the U-shaped member, so that the handle bight can be moved over and to one side of the top of the rack, and a catch member on each of said handle legs so disposed and arranged as to fit under the locking bight when the locking bight is in the locked position, whereby lifting the rack by said handle bight with the locking bight in said catch means holds the locking bight across the rack so as to restrain the upper edge of the film within said rack.

2. Apparatus according to claim 1 in which all structure with the exception of the locking bar and handle means is made of a translucent material which permits the passage of light therethrough.

References Cited in the file of this patent

UNITED STATES PATENTS

| | | |
|---|---|---|
| 1,398,938 | Chapman | Nov. 29, 1921 |
| 1,508,804 | Pappajion | Sept. 16, 1924 |
| 1,909,566 | Bender et al. | May 16, 1933 |
| 2,120,706 | Lynch | June 14, 1938 |
| 2,405,233 | Peckham | Aug. 6, 1946 |
| 2,458,699 | Ginsberg | Jan. 11, 1949 |
| 2,489,892 | Jenkins | Nov. 29, 1949 |
| 2,506,401 | Winans | May 2, 1950 |
| 2,519,682 | Magill | Aug. 22, 1950 |
| 2,559,681 | Sensemen | July 10, 1951 |
| 2,617,339 | Gilkerson | Nov. 11, 1952 |
| 2,753,779 | Krause | July 10, 1956 |

FOREIGN PATENTS

| | | |
|---|---|---|
| 809,755 | Germany | Aug. 2, 1951 |